United States Patent
Atri et al.

(10) Patent No.: US 9,430,314 B2
(45) Date of Patent: Aug. 30, 2016

(54) MEMORY PROGRAM UPON SYSTEM FAILURE

(71) Applicant: Cypress Semiconductor Corporation, San Jose, CA (US)

(72) Inventors: Sunil Atri, Cupertino, CA (US); Cliff Zitlaw, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 190 days.

(21) Appl. No.: 14/054,880

(22) Filed: Oct. 16, 2013

(65) Prior Publication Data

US 2015/0106662 A1   Apr. 16, 2015

(51) Int. Cl.
*G06F 11/00* (2006.01)
*G06F 11/07* (2006.01)

(52) U.S. Cl.
CPC ....... *G06F 11/0787* (2013.01); *G06F 11/0736* (2013.01); *G06F 11/0757* (2013.01)

(58) Field of Classification Search
CPC ............. G06F 11/0787; G06F 1/0757; G06F 11/0778
See application file for complete search history.

(56) References Cited

U.S. PATENT DOCUMENTS

| | | | | |
|---|---|---|---|---|
| 6,125,459 A * | 9/2000 | Andoh et al. | ................... | 714/55 |
| 6,336,174 B1 * | 1/2002 | Li et al. | ........................ | 711/162 |
| 7,051,332 B2 * | 5/2006 | Gatto et al. | .................. | 718/108 |
| 8,069,309 B1 * | 11/2011 | Long | ............................. | 711/118 |
| 8,413,120 B2 * | 4/2013 | Emberling | .................... | 717/127 |
| 2010/0083043 A1 * | 4/2010 | Niioka | ............................ | 714/23 |
| 2013/0290789 A1 * | 10/2013 | Wen | .................................. | 714/37 |
| 2014/0201578 A1 * | 7/2014 | Kosut et al. | ................... | 714/55 |

* cited by examiner

*Primary Examiner* — Philip Guyton (57) ABSTRACT

A system and method for programming a memory device with debug data upon a system failure is disclosed herein. For example, the system can include a timer device, a buffer, a register, and a memory device. The buffer can be configured to receive debug data. The register can be configured to receive memory address information. Also, the memory device can be configured to store the debug data from the buffer at a memory address corresponding to the memory address information when a timer value of the timer device reaches zero. Further, the system can include a processing unit configured to provide the timer value to the timer device and the memory address information to the register.

14 Claims, 9 Drawing Sheets

MEMORY PROGRAM UPON SYSTEM FAILURE

BACKGROUND

1. Field

Embodiments included herein generally relate to programming a memory device upon a failure in an electronic system. More particularly, embodiments relate to programming debug data to the memory device upon a timer elapsing or "timing out."

2. Background

In embedded electronic systems, diagnostic information is oftentimes written (e.g., programmed) to a memory device for debug purposes. For example, at periodic intervals, diagnostic information associated with the embedded system is written to a non-volatile memory device so that, upon system failure, the diagnostic information can be used for debug purposes. In writing the diagnostic information to the memory device, system resources (e.g., memory data bus and address/control bus) are used for the diagnostic write operation.

There are at least two drawbacks with the above diagnostic/debug process. First, since the diagnostic information is written to the memory device repeatedly, this introduces wear on the memory device. This wear on the memory device is unnecessary if a system failure does not occur. Second, since system resources are consumed during the diagnostic write operation to the memory device, this may affect performance of the embedded system during normal operation.

SUMMARY

Therefore, there is a need for flexibility in the diagnostic process and architecture in electronic systems to reduce the wear on memory devices used to store debug data and to minimize the impact on system performance.

An embodiment includes a system for programming a memory device with debug data upon a system failure. The system can include a timer device, a buffer, a register, and a memory device. The buffer can be configured to receive debug data. The register can be configured to receive memory address information. Also, the memory device can be configured to store the debug data from the buffer at a memory address corresponding to the memory address information when a timer value of the timer device reaches zero. Further, the system can include a processing unit configured to provide the timer value to the timer device and the memory address information to the register.

Another embodiment includes a method for programming debug data to a memory device upon a system failure. In the method, debug data is received by a buffer and memory address information received by a register. Also, a memory device is configured to store the debug data from the buffer at a memory address corresponding to the memory address information when a timer value of a timer device reaches zero. Further, the method can also include updating the debug data in the buffer when the timer value of the timer device has not reached zero.

Further features and advantages of the embodiments disclosed herein, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the embodiments and to enable a person skilled in the relevant art to make and use the invention.

Embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Figure 1:
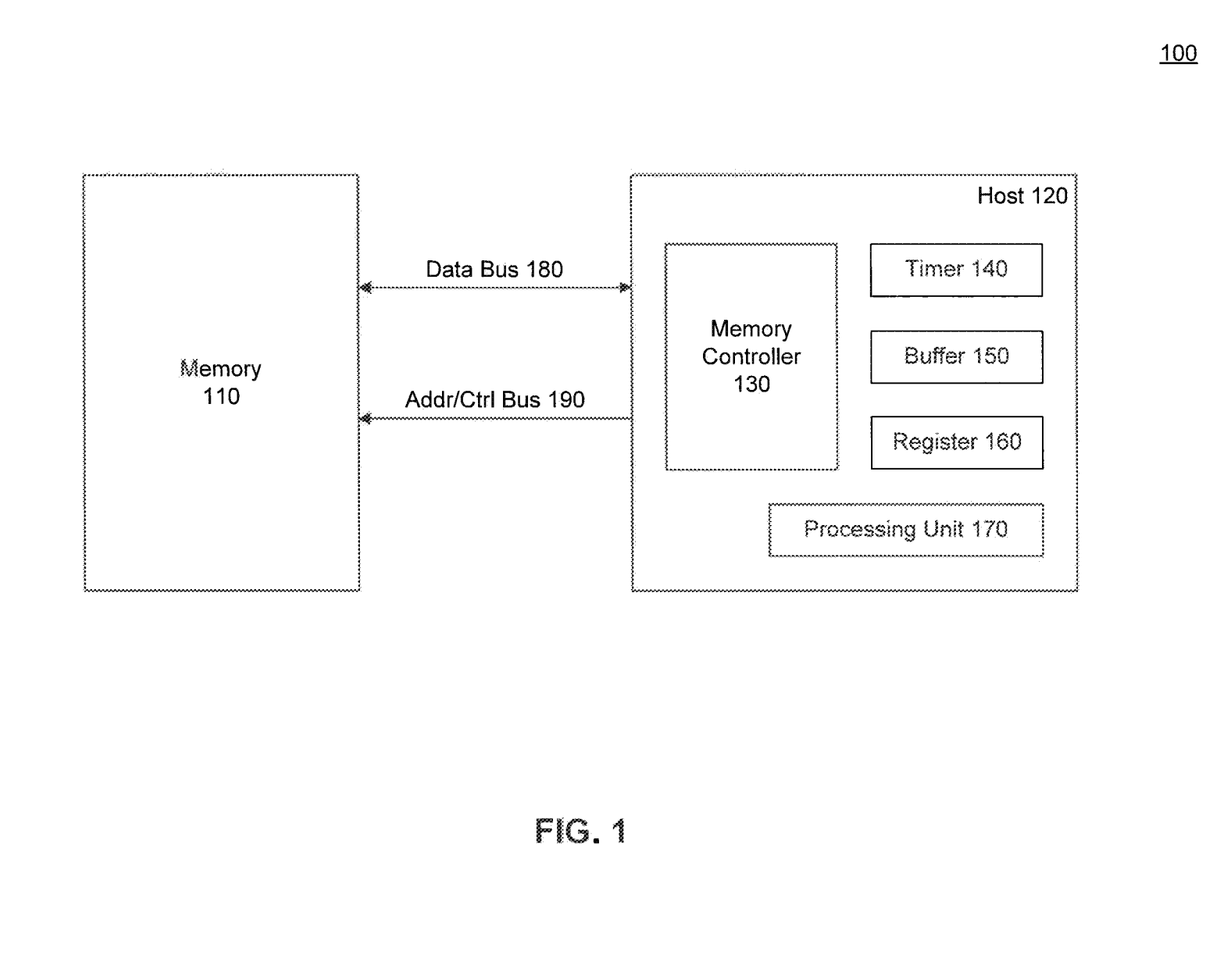
FIG. 1 is an illustration of a first embodiment of a system for programming a memory device with debug data upon a system failure.

FIG. 1 is an illustration of a first embodiment of a system 100 for programming a memory device with debug data upon a system failure. System 100 includes a memory device 110 and a host device 120. Memory device 110 and host device 120 can be integrated on the same chip, on separate chips in the same semiconductor package, or on separate chips in separate semiconductor packages, according to an embodiment.

In an embodiment, memory device 110 can be a non-volatile memory device such as, for example, a Flash memory device. Memory device 110 is in communication with host device 120 via data bus 180 and addr/ctrl bus 190. Data bus 180 is used to transfer data between memory device 110 and host device 120 during, for example, read and write operations. Addr/ctrl bus 190 is an address/control bus used to carry address (e.g., memory address information for a read and write operations) and control signals (e.g., read and write command operations) between host device 120 to memory device 110. Data, address, and control buses between a memory device and a host device are known to a person skilled in the relevant art.

Host device 120 includes a memory controller 130, a timer 140, a buffer 150, a register 160, and a processing unit 170. In an embodiment, memory controller 130 is configured to manage the flow of data between host device 120 and memory device 110 via data bus 180 and addr/ctrl bus 190. For example, memory controller 130 includes circuitry to read data from and to write data to memory device 110. In an embodiment, processing unit 170 includes a processing unit and a memory device (e.g., Dynamic Random Access Memory device) configured to store instructions for the processing unit.

In an embodiment, timer 140 is a watchdog timer. The watchdog timer is an electronic timer (e.g., software or hardware timer) used in system 100 to detect and recover from a system failure. During normal operation, the watchdog timer can be regularly or periodically restarted by processing unit 170 to prevent it from elapsing or "timing out," according to an embodiment. If the watchdog timer elapses or times out, then this is an indication of a system failure in system 100. System failures can include, for example, software running on host device 120 that is stuck in an infinite loop and a hardware failure in system 100 that does not allow processing unit 170 to restart timer 140. In an embodiment, in response to the watchdog timer elapsing or timing out, the watchdog timer can initiate a corrective action such as, for example, a system reset, a non-maskable interrupt, a maskable interrupt, a power cycling operation, a fail-safe activation, or a combination thereof.

Buffer 150 is a data buffer configured to receive and store debug data of system 100, according to an embodiment. In an embodiment, buffer 150 can be a memory device such as, for example, a volatile memory device (e.g., Dynamic Random Access Memory device). The debug data can be system dependent and can be based on, for example, probed nodes in system 100—e.g., one or more locations in system 100 that includes debug data of interest—that allow observation of these nodes via a logic analyzer. The probed nodes can provide information on the status of hardware and software components in system 100 (e.g., memory device 110, host device 120, and software running on host device 120), date and time information, data traffic information (e.g., data packet processing between memory device 110 and host device 120), and power supplies associated with system 100. Debugging tools and methodologies of embedded systems such as, for example, system 100 are well known to a person skilled in the relevant art.

In an embodiment, register 160 is configured to receive and store memory address information associated with memory device 110, in which the memory address information corresponds to an address space in memory device 110 used to store the debug data upon a system failure. In an embodiment, memory device 110 can include a designated address space for the debug data, in which the designated address space is not used during normal operation of system 100 (e.g., data is not read from or programmed to the designated address space during normal read and write operations). In another embodiment, the address space in memory device 110 used to store the debug data can be used during the normal operation of system 100. Here, upon a system failure, existing data in the address space can be over-written by the debug data.

Figure 2:
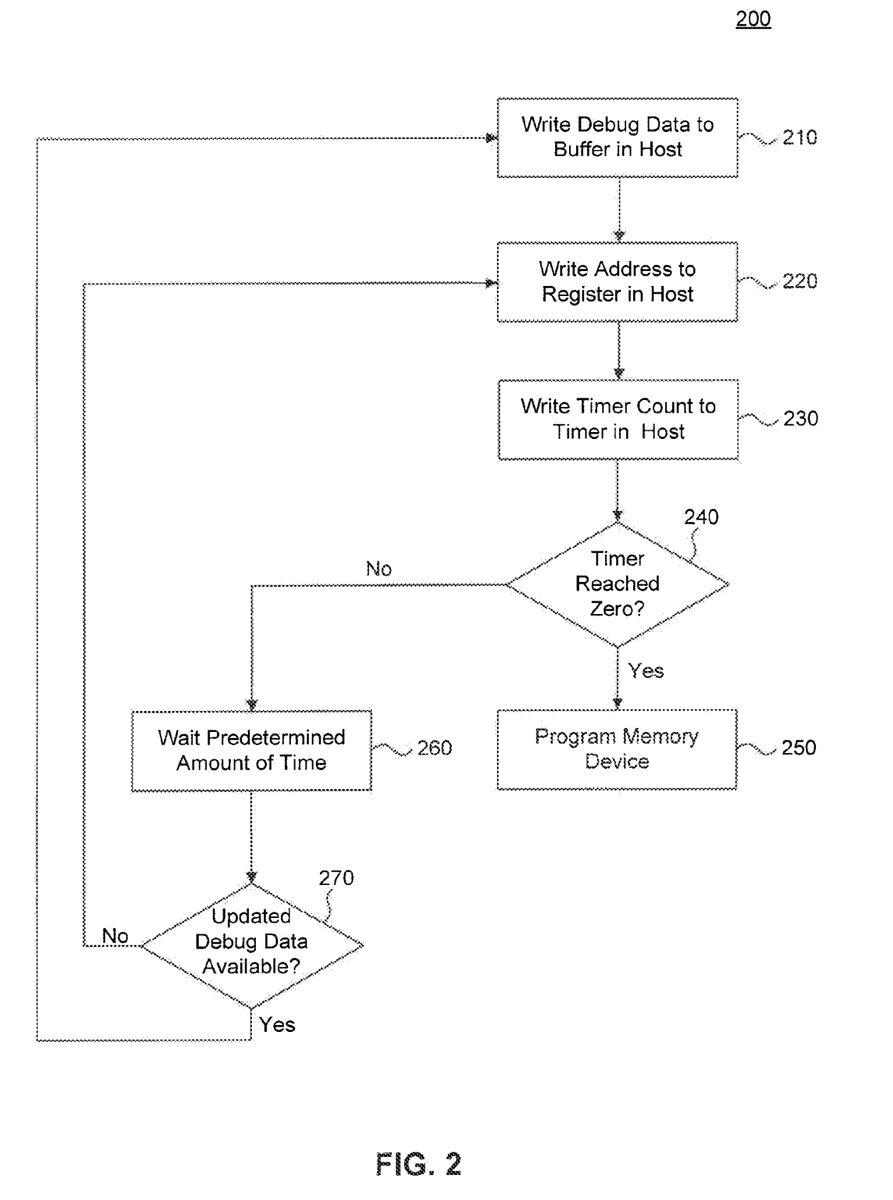
FIG. 2 is an illustration of a first embodiment of a method for programming a memory device with debug data upon a system failure.

FIG. 2 is an illustration of a first embodiment of a method 200 for programming a memory device with debug data upon a system failure. Method 200 can be executed by, for example, system 100 of FIG. 1.

In step 210, debug data is written to a buffer in a host device. In referring to system 100 of FIG. 1, the debug data is written to buffer 150 in host device 120. The debug data can be system dependent and can be based on, for example, probed nodes in system 100 that allow observation of these nodes via a logic analyzer.

In step 220, memory address information is written to a register in the host device. In referring to system 100 of FIG. 1, the memory address information is written to register 160 in host device 120. The memory address information is provided by processing unit 170 to register 160, according to an embodiment. In an embodiment, the memory address information in register 160 corresponds to the address space in memory device 110 where debug data is stored upon a system failure.

In step 230, a timer count is written to a timer in the host device. In referring to system 100 of FIG. 1, the timer count is written to timer 140 (e.g., a watchdog timer) in host device 120. The timer count can be written to timer 140 by processing unit 170, according to an embodiment. The timer count can be specific to the design of system 100 and can be, for example, 100, 200, or 300 ms.

In step 240, an inquiry is made on whether the timer has reached zero. If so, then this indicates that a system failure has occurred and method 200 proceeds to step 250.

In step 250, the debug data in the buffer (e.g., buffer 150 of FIG. 1) is written to a memory device. In referring to FIG. 1, the debug data in buffer 150 is written to memory device 110 via memory controller 130, data bus 180, and addr/ctrl bus 190. In particular, the debug data is written to the address space in memory device 110 corresponding to the memory address information stored in register 160 (from step 220).

In referring back to step 240, if the timer has not reached zero, then method 200 proceeds to step 260. In step 260, a predetermined amount of time transpires before proceeding to step 270. In an embodiment, the predetermined amount of time is design specific and can be based on a predicted frequency (or period of time) at which updated debug data may be available from system 100. For example, if updated debug data is available from system 100 every 10 ms, then the predetermined amount of time from step 260 can be 10 ins so that the updated debug data can be written (e.g., stored) in buffer 150 of FIG. 1.

In step 270, an inquiry is made on whether updated debug data is available. In an embodiment, updated debug data refers to debug data that is different from the debug data stored in the buffer (from step 210). If updated debug data is available, then this debug data is written to the buffer (at step 210) and method 200 continues to step 220. If updated debug data is not available, then memory address information is written to the register in the host device (at step 220) and method 200 continues to step 230.

A benefit, among others, of the architecture of system 100 in FIG. 1 and method 200 of FIG. 2 is that memory device 110 is not programmed with debug data in a repetitive (or periodic) manner, thus reducing the wear on memory device 110. Another benefit is that data bus and address/control bus resources in system 100 are not consumed when updating debug data during normal operation of system 100. That is, data bus 180 and adds/ctrl bus 190 are not used during the debug process unless timer 140 has reached zero, thus reducing the impact to system 100 when programming memory device 110 with debug data.

In yet another benefit, although a system failure can occur in one or more components of host device 120, the debug data can be programmed to memory device 110. In an embodiment, in referring to FIG. 1, although a system failure can occur in processing unit 170 (e.g., which includes a processing unit and memory device), memory controller 130, timer 140, buffer 150 and register 160 can remain active and operational. Since these components of host device 120 are active and operational, the debug data can be programmed to memory device 110 (as described above) upon the system failure in processing unit 170.

Figure 3:
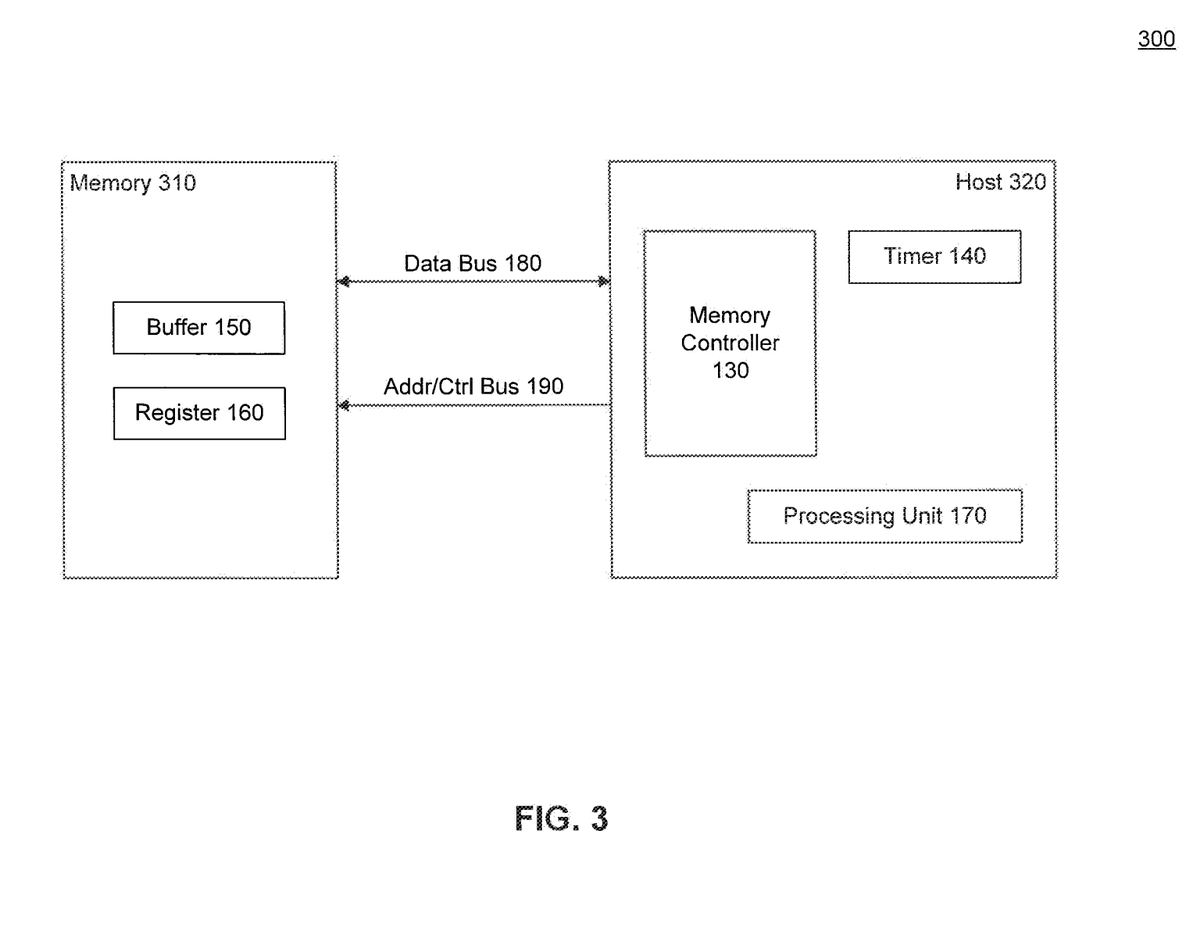
FIG. 3 is an illustration of a second embodiment of a system for programming a memory device with debug data upon a system failure.

FIG. 3 is an illustration of a second embodiment of a system 300 for programming a memory device with debug data upon a system failure. System 300 includes a memory device 310 and a host device 320. Memory device 310 and host device 320 can be integrated on the same chip, on separate chips in the same semiconductor package, or on separate chips in separate semiconductor packages, according to an embodiment.

In an embodiment, memory device 310 can be a non-volatile memory device such as, for example, a Flash memory device. Memory device 310 includes buffer 150 and register 160. In an embodiment, buffer 150 and register 160 are each allocated memory space in memory device 310, in which the allocated memory space is not used for normal operations of system 300 (e.g., read and write operations not associated with a system failure mode of operation). In an embodiment, the address space used by buffer 150 and the address space corresponding to the memory address information stored in register 160 (e.g., address space in memory device 310 where the debug data is stored upon a system failure) are different from one another. Memory device 310 is in communication with host device 320 via data bus 180 and addr/ctrl bus 190. Buffer 150, register 160, data bus 180, and addr/ctrl bus 190 are described above with respect to FIG. 1.

Host device 320 includes memory controller 130, timer 140, and processing unit 170. Memory controller 130, timer 140, and processing unit 170 are described above with respect to FIG. 1.

Figure 4:
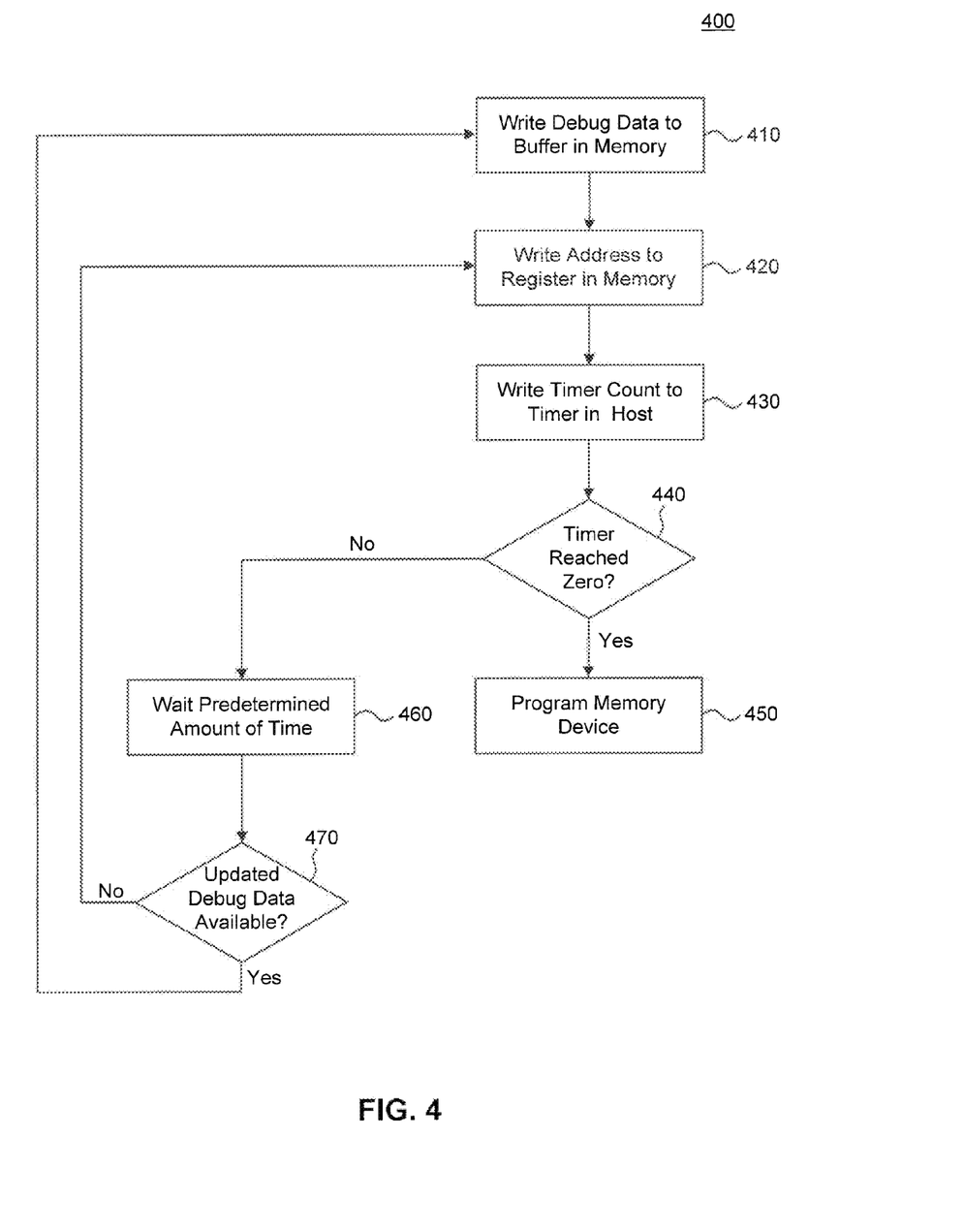
FIG. 4 is an illustration of a second embodiment of a method for programming a memory device with debug data upon a system failure.

FIG. 4 is an illustration of a second embodiment of a method 400 for programming a memory device with debug data upon a system failure. Method 400 can be executed by, for example, system 300 of FIG. 3.

In step 410, debug data is written to a buffer in a memory device. In referring to system 300 of FIG. 3, the debug data is written from host device 320 to buffer 150 in memory device 310 via memory controller 130, data bus 180, and adds/ctrl bus 190. The debug data can be system dependent and can be based on, for example, probed nodes in system 300 that allow observation of these nodes via a logic analyzer.

In step 420, memory address information is written to a register in the memory device. In referring to system 300 of FIG. 3, the memory address information is written to register 160 in memory device 310. The memory address information is provided by processing unit 170 to register 160 via memory controller 130, data bus 180, and addr/ctrl bus 190, according to an embodiment. In embodiment, the memory address information in register 160 corresponds to the address space in memory device 310 where debug data is stored upon a system failure.

In step 430, a timer count is written to a timer in a host device. In referring to system 300 of FIG. 3, the timer count is written to timer 140 (e.g., a watchdog timer) in host device 320. The timer count can be written to timer 140 by processing unit 170, according to an embodiment. The timer count can be specific to the design of system 300 and can be, for example, 100, 200, or 300 ms.

In step 440, an inquiry is made on whether the timer has reached zero. If so, then this indicates that a system failure has occurred and method 400 proceeds to step 450.

In step 450, the debug data in the buffer (e.g., buffer 150 of FIG. 3) is written to the memory device. In referring to FIG. 3, the debug data in buffer 150 is written to memory device 310. In particular, the debug data is written to the address space in memory device 310 corresponding to the memory address information stored in register 160 (from step 420). In an embodiment, a system failure program command is issued by host device 320 to memory device 310 (e.g., via addr/ctrl bus 190) to initiate the program of the debug data from buffer 150 at the memory address space corresponding to the memory address information stored in register 160. The system failure program command is a program command—in addition to a program command used during the normal operation of system 300—executed upon the system failure, according to an embodiment.

In referring back to step 440, if the timer has not reached zero, then method 400 proceeds to step 460. In step 460, a predetermined amount of time transpires before proceeding to step 470. In an embodiment, the predetermined amount of time is design specific and can be based on a predicted frequency (or period of time) at which updated debug data may be available from system 300. For example, if updated debug data is available from system 300 every 10 ms, then the predetermined amount of time from step 460 can be 10 ms so that the updated debug data can be written (e.g., stored) in buffer 150 of FIG. 3.

In step 470, an inquiry is made on whether updated debug data is available. In an embodiment, updated debug data refers to debug data that is different from the debug data stored in the buffer (from step 410). If updated debug data is available, then this debug data is written to the buffer (at step 410) and method 400 continues to step 420. In referring to FIG. 3, the updated debug data can be written from host device 320 to buffer 150 using memory controller 130, data bus 180, and addr/ctrl bus 190. If updated debug data is not available, then memory address information is written to the register in the memory device (at step 420) and method 400 continues to step 430.

A benefit, among others, of the architecture of system 300 in FIG. 3 and method 400 of FIG. 4 is that, upon a system failure, the debug data is transferred from buffer 150 within memory device 310 to an address space within memory device 310. This, in turn, eliminates the time associated with transferring the debug data from host device 320 to memory device 310 via memory controller 130, data bus 180, and addr/ctrl bus 190.

Another benefit is that, although a system failure can occur in one or more components of host device 320, the debug data can be programmed to memory device 310. In an embodiment, in referring to FIG. 3, although a system failure can occur in processing unit 170 (e.g., which includes a processing unit and memory device), memory controller 130 and timer 140 can remain active and operational. Since these components of host device 320 are active and operational, the debug data can be programmed to memory device 310 (as described above) upon the system failure in processing unit 170.

Figure 5:
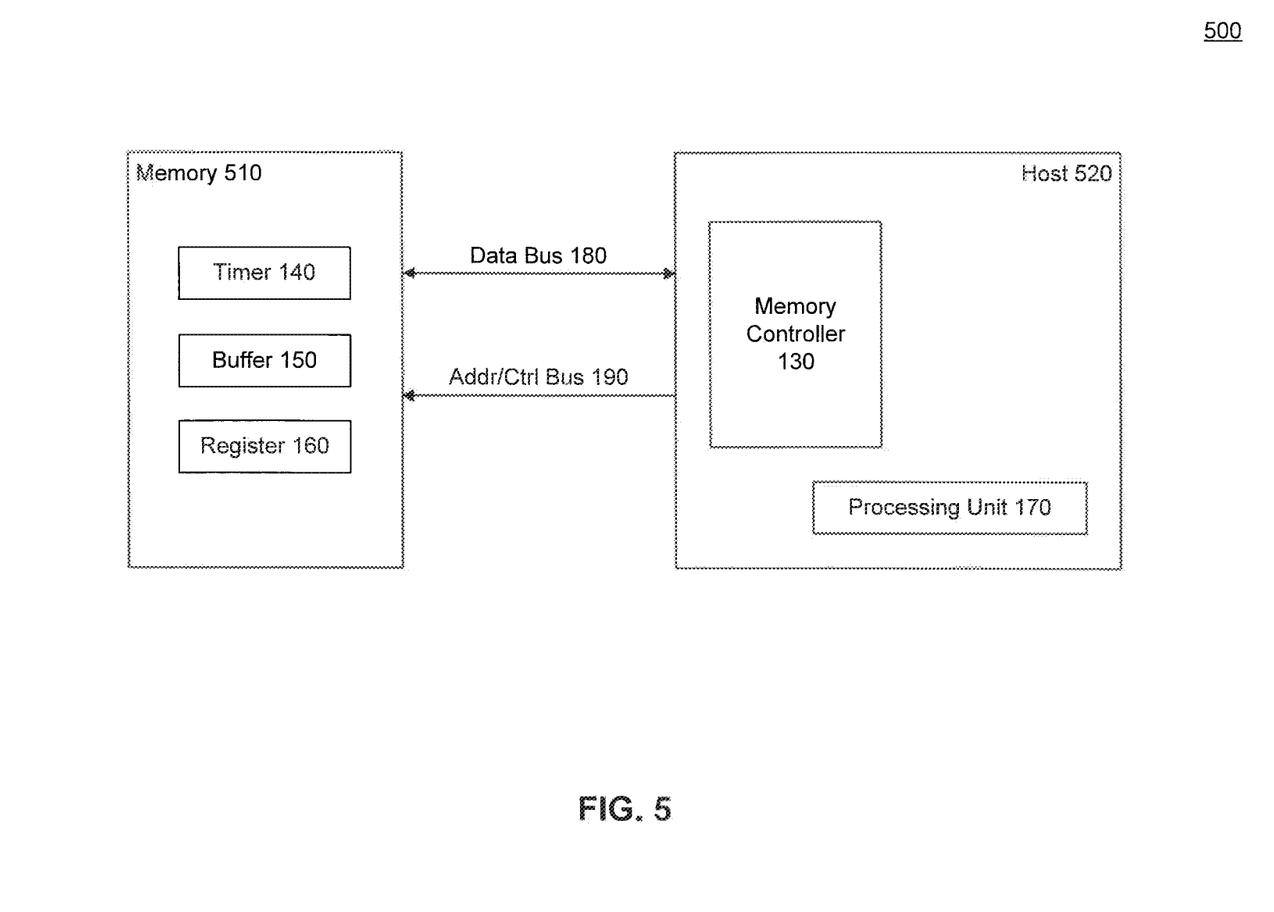
FIG. 5 is an illustration of a third embodiment of a system for programming a memory device with debug data upon a system failure.

FIG. 5 is an illustration of a third embodiment of a system 500 for programming a memory device with debug data upon a system failure. System 500 includes a memory device 510 and a host device 520. Memory device 510 and host device 520 can be integrated on the same chip, on separate chips in the same semiconductor package, or on separate chips in separate semiconductor packages, according to an embodiment.

In an embodiment, memory device 510 can be a non-volatile memory device such as, for example, a Flash memory device. Memory device 510 includes timer 140, buffer 150, and register 160. In an embodiment, buffer 150 and register 160 are each allocated memory space in memory device 510, in which the allocated memory space is not used for normal operations of system 500 (e.g., read and write operations not associated with a system failure mode of operation). In an embodiment, the address space used by buffer 150 and the address space corresponding to the memory address information stored in register 160 (e.g., address space in memory device 510 where the debug data is stored upon a system failure) are different from one another. Memory device 510 is in communication with host device 520 via data bus 180 and addr/ctrl bus 190. Timer 140, buffer 150, register 160, data bus 180, and addr/ctrl bus 190 are described above with respect to FIG. 1.

Host device 520 includes memory controller 130 and processing unit 170. Memory controller 130 and processing unit 170 are described above with respect to FIG. 1.

Figure 6:
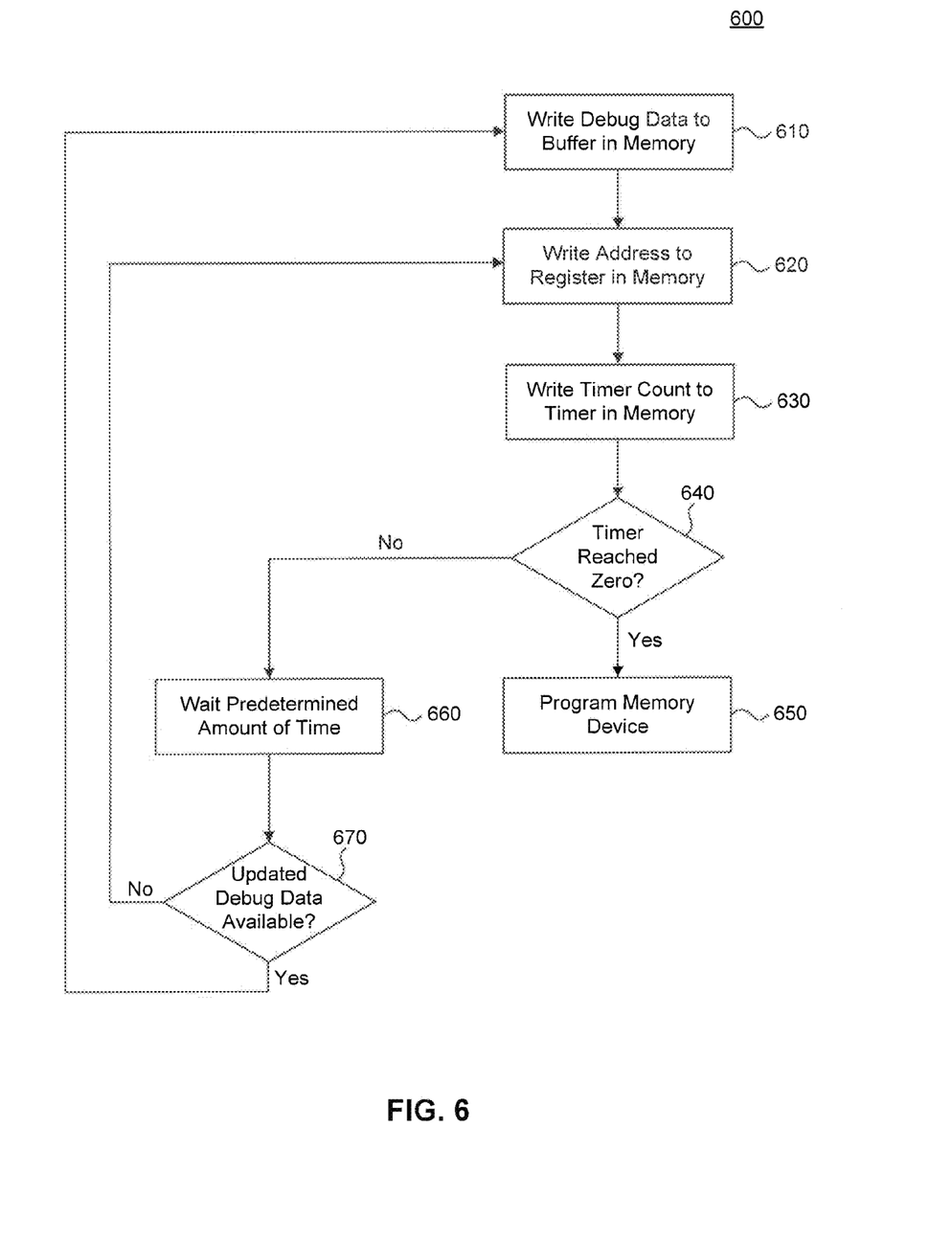
FIG. 6 is an illustration of a third embodiment of a method for programming a memory device with debug data upon a system failure.

FIG. 6 is an illustration of a third embodiment of a method 600 for programming a memory device with debug data upon a system failure. Method 600 can be executed by, for example, system 500 of FIG. 5.

In step 610, debug data is written to a buffer in a memory device. In referring to system 500 of FIG. 5, the debug data is written from host device 520 to buffer 150 in memory device 510 via memory controller 130, data bus 180, and addr/ctrl bus 190. The debug data can be system dependent and can be based on, for example, probed nodes in system 500 that allow observation of these nodes via a logic analyzer.

In step 620, memory address information is written to a register in the memory device. In referring to system 500 of FIG. 5, the memory address information is written to register 160 in memory device 510. The memory address information is provided by processing unit 170 to register 160 via memory controller 130, data bus 180, and addr/ctrl bus 190, according to an embodiment. In an embodiment, the memory address information in register 160 corresponds to the address space in memory device 510 where debug data is stored upon a system failure.

In step 630, a timer count is written to a timer in the memory device. In referring to system 500 of FIG. 5, the timer count is written to timer 140 (e.g., a watchdog timer) in memory device 510. The timer count can be provided by processing unit 170 to timer 140 via microcontroller 130, data bus 180, and addr/ctrl bus 190, according to an embodiment. The timer count can be specific to the design of system 500 and can be, for example, 100, 200, or 300 ms.

In step 640, an inquiry is made on whether the timer has reached zero. If so, then this indicates that a system failure has occurred and method 600 proceeds to step 650.

In step 650, the debug data in the buffer (e.g., buffer 150 of FIG. 5) is written to the memory device. In referring to FIG. 5, the debug data in buffer 150 is written to memory device 510. In particular, the debug data is written to the address space in memory device 510 corresponding to the memory address information stored in register 160 (from step 620). In an embodiment, a system failure program command is issued by tuner 140 in memory device 510 to initiate the program of the debug data from buffer 150 at the memory address space corresponding to the memory address information stored in register 160. The system failure program command is a program command—in addition to a program command used during the normal operation of system 500—executed upon the system failure, according to an embodiment.

In referring back to step 640, if the timer has not reached zero, then method 600 proceeds to step 660. In step 660, a predetermined amount of time transpires before proceeding to step 670. In an embodiment, the predetermined amount of time is design specific and can be based on a predicted frequency (or period of time) at which updated debug data may be available from system 500. For example, if updated debug data is available from system 500 every 10 ms, then the predetermined amount of time from step 660 can be 10 ms so that the updated debug data can be written (e.g., stored) in buffer 150 of FIG. 5.

In step 670, an inquiry is made on whether updated debug data is available. In an embodiment, updated debug data refers to debug data that is different from the debug data stored in the buffer (from step 610). If updated debug data is available, then this debug data is written to the buffer (at step 610) and method 600 continues to step 620. In referring to FIG. 5, the updated debug data can be written from host device 520 to buffer 150 using memory controller 130, data bus 180, and addr/ctrl bus 190. If updated debug data is not available, then memory address information is written to the register in the memory device (at step 620) and method 600 continues to step 630.

A benefit, among others, of the architecture of system 500 in FIG. 5 and method 600 of FIG. 6 is that, upon a system failure, a system failure program command is issued by timer 140 in memory device 510, in which the debug data is transferred from buffer 150 within memory device 510 to an address space within memory device 510. This, in turn, eliminates the time associated with transferring the debug data from host device 520 to memory device 510 via memory controller 130, data bus 180, and addr/ctrl bus 190. Also, by having timer 140 in memory device 510 issue the system failure program command, the programming of the debug information is independent of host device 520, which may be a cause of the system failure.

Figure 7:
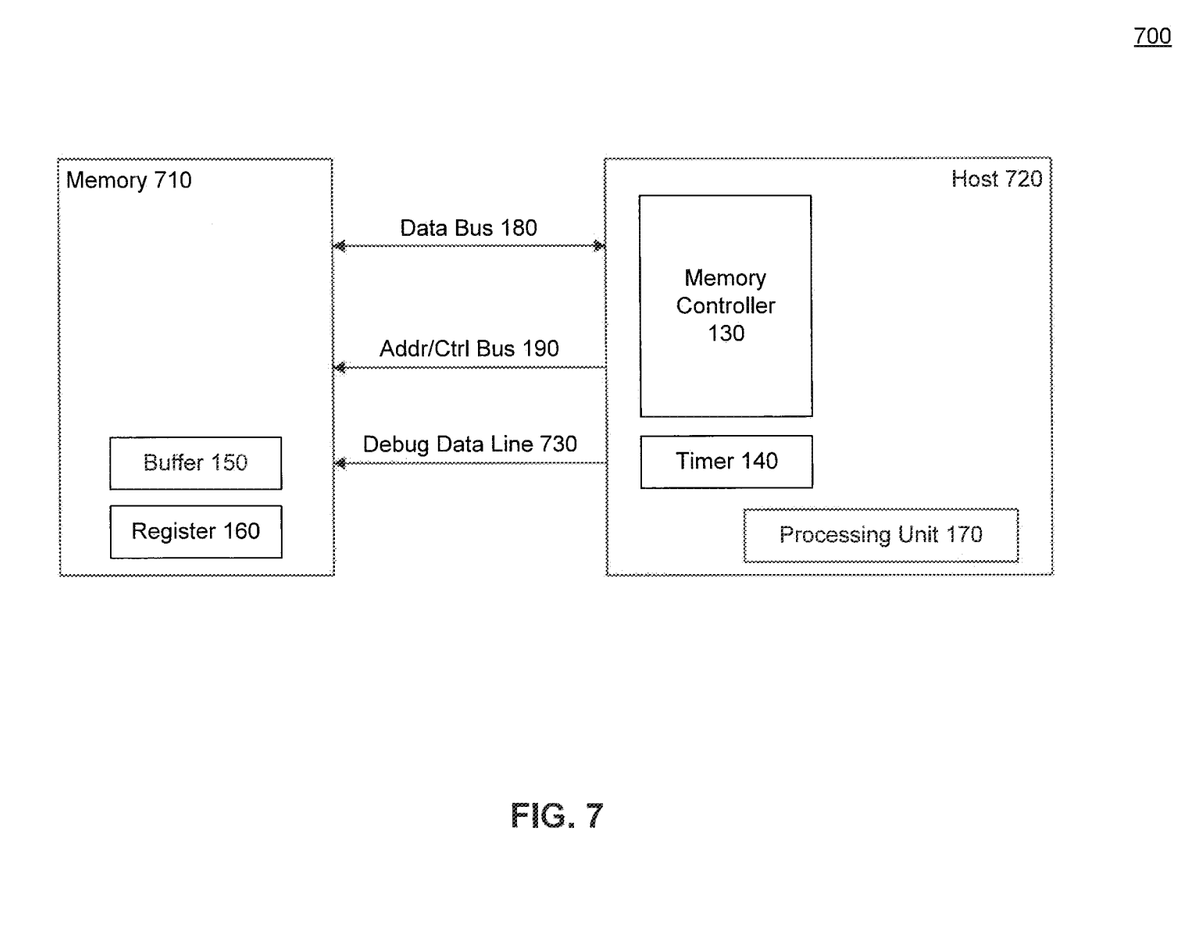
FIG. 7 is an illustration of a fourth embodiment of a system for programming a memory device with debug data upon a system failure.

FIG. 7 is an illustration of a fourth embodiment of a system 700 for programming a memory device with debug data upon a system failure. System 700 includes a memory device 710 and a host device 720. Memory device 710 and host device 720 can be integrated on the same chip, on separate chips in the same semiconductor package, or on separate chips in separate semiconductor packages, according to an embodiment.

In an embodiment, memory device 710 can be a non-volatile memory device such as, for example, a Flash memory device. Memory device 710 includes buffer 150 and register 160. In an embodiment, buffer 150 and register 160 are each allocated memory space in memory device 710, in which the allocated memory space is not used for normal operations of system 700 (e.g., read and write operations not associated with a system failure mode of operation). In an embodiment, the address space used by buffer 150 and the address space corresponding to the memory address information stored in register 160 (e.g., address space in memory device 710 where the debug data is stored upon a system failure) are different from one another. Memory device 710 is in communication with host device 720 via data bus 180, addr/ctrl bus 190, and a debug data line 730. Buffer 150, register 160, data bus 180, and addr/ctrl bus 190 are described above with respect to FIG. 1.

Debug data line 730 is configured to initiate a program operation in memory device 710 upon a system failure, according to an embodiment. In an embodiment, host device 720 includes a pin dedicated to debug data line 730 and memory device 710 includes a corresponding dedicated pin. In another embodiment, an existing pin from host device 720 can be used for debug data line 730 and a corresponding existing pin from memory device 710 can also be used for debug data line 730.

Host device 720 includes memory controller 130, timer 140, and processing unit 170. Memory controller 130, timer 140, and processing unit 170 are described above with respect to FIG. 1.

Although not illustrated in FIG. 7, a power supply monitor can be included in system 700. In an embodiment, the power supply monitor can be integrated into host device 720 or external to both memory device 710 and host device 720. The power supply monitor includes a pin dedicated to debug data line 730 and memory device 710 includes a corresponding dedicated pin, according to an embodiment. The power supply monitor is configured to monitor a voltage level associated with one or more power supplies of host device 720. In an embodiment, if the voltage level falls below a predetermined value (e.g., a voltage level in which one or more components of host device 720—memory controller 130, timer 140 and processing unit 170 are non-operational), then the power supply monitor is configured to initiate a program operation (via debug data line 730) in memory device 710 upon the system failure.

Figure 8:
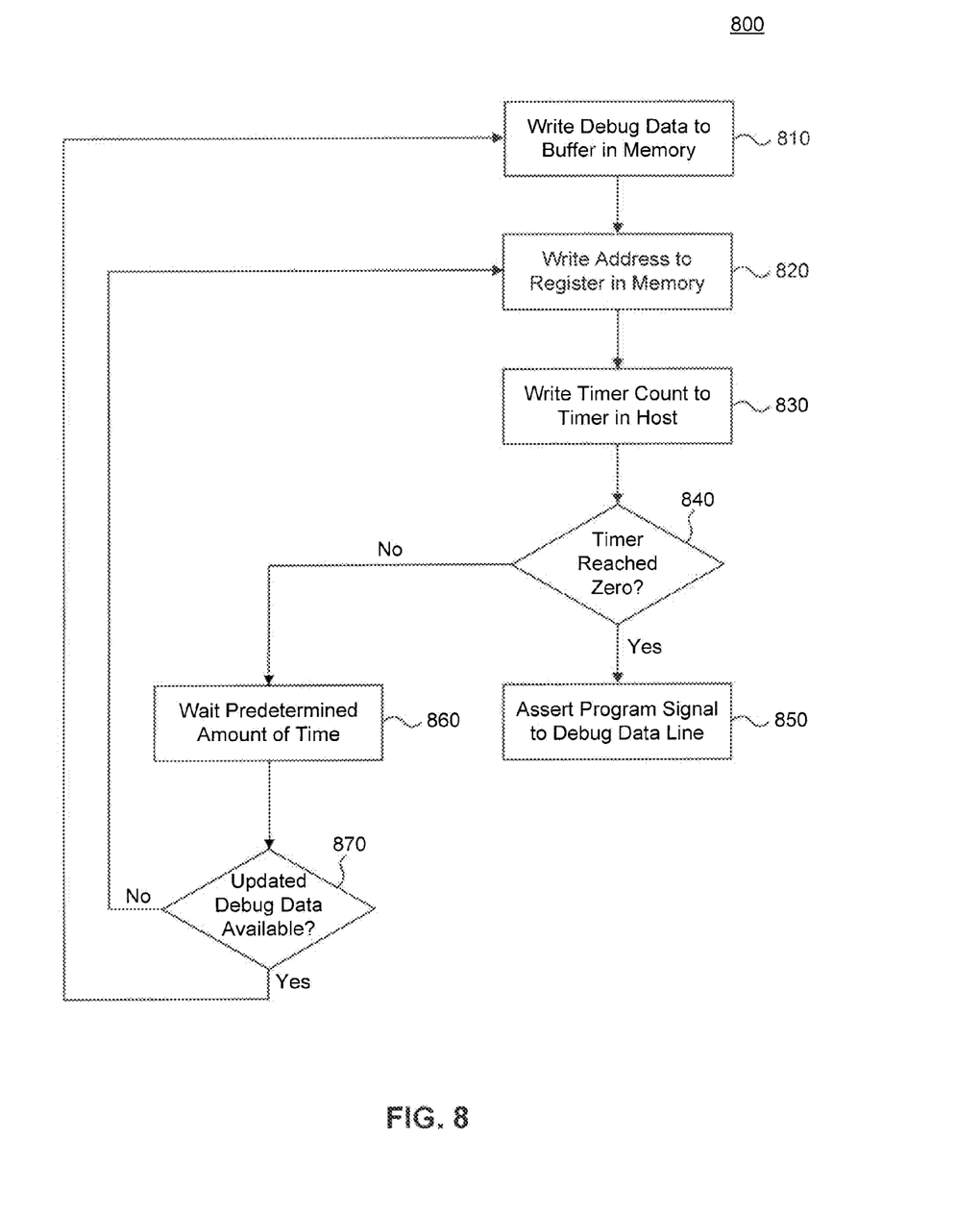
FIG. 8 is an illustration of a fourth embodiment of a method for programming a memory device with debug data upon a system failure.

FIG. 8 is an illustration of a fourth embodiment of a method 800 for programming a memory device with debug data upon a system failure. Method 800 can be executed by, for example, system 700 of FIG. 7.

In step 810, debug data is written to a buffer in a memory device. In referring to system 700 of FIG. 7, the debug data is written from host device 720 to buffer 150 in memory device 710 via memory controller 130, data bus 180, and addr/ctrl bus 190. The debug data can be system dependent and can be based on, for example, probed nodes in system 700 that allow observation of these nodes via a logic analyzer.

In step 820, memory address information is written to a register in a memory device. In referring to system 700 of FIG. 7, the memory address information is written to register 160 in memory device 710. The memory address information is provided by processing unit 170 to register 160 via memory controller 130, data bus 180, and addr/ctrl bus 190, according to an embodiment. In an embodiment, the memory address information in register 160 corresponds to the address space in memory device 710 where debug data is stored upon a system failure.

In step 830, a timer count is written to a timer in a host device. In referring to system 700 of FIG. 7, the timer count is written to timer 140 (e.g., a watchdog timer) in host device 720. The timer count can be provided by processing unit 170 to timer 140, according to an embodiment. The timer count can be specific to the design of system 700 and can be, for example, 100, 200, or 300 ms.

In step 840, an inquiry is made on whether the timer has reached zero. If so, then this indicates that a system failure has occurred and method 800 proceeds to step 850.

In step 850, a system failure program command is asserted and the debug data in the buffer (e.g., buffer 150 of FIG. 7) is written to the memory device. In referring to FIG. 7, the debug data in buffer 150 is written to memory device 710. In particular, the debug data is written to the address space in memory device 710 corresponding to the memory address information stored in register 160 (from step 820).

In an embodiment, the system failure program command is issued by timer 140 to initiate the program of the debug data from buffer 150 at the memory address space corresponding to the memory address information stored in register 160. The system failure program command is a program command—in addition to a program command used during the normal operation of system 700—executed upon the system failure, according to an embodiment. Also, in an embodiment, the system failure program command is issued on debug data line 730 in FIG. 7.

In referring back to step 840, if the timer has not reached zero, then method 800 proceeds to step 860. In step 860, a predetermined amount of time transpires before proceeding to step 870. In an embodiment, the predetermined amount of time is design specific and can be based on a predicted frequency (or period of time) at which updated debug data may be available from system 700. For example, if updated debug data is available from system 700 every 10 ms, then the predetermined amount of time from step 860 can be 10 ms so that the updated debug data can be written (e.g., stored) in buffer 150 of FIG. 7.

In step 870, an inquiry is made on whether updated debug data is available. In an embodiment, updated debug data refers to debug data that is different from the debug data stored in the buffer (from step 810). If updated debug data is available, then this debug data is written to the buffer (at step 810) and method 800 continues to step 820. In referring to FIG. 7, the updated debug data can be written from host device 720 to buffer 150 using memory controller 130, data bus 180, and addr/ctrl bus 190. If updated debug data is not available, then memory address information is written to the register in the memory device (at step 820) and method 800 continues to step 830.

A benefit, among others, of the architecture of system 700 in FIG. 7 and method 800 of FIG. 8 is that, upon a system failure, a system failure program command is issued by timer 140, in which the debug data is transferred from buffer 150 within memory device 710 to an address space within memory device 710. This, in turn, eliminates the time associated with transferring the debug data from host device 720 to memory device 710 via memory controller 130, data bus 180, and addr/ctrl bus 190. Also, by having timer 140 issue the system failure program command, the programming of the debug information is independent of memory controller 130 and processing unit 170, which may be a cause of the system failure.

In the embodiment of system 700 with the power supply monitor integrated into host device 720 or external to both memory device 710 and host device 720, if a voltage level associated with one or more power supplies of host device 720 falls below a predetermined value (e.g., a voltage level in which one or more components of host device 720—memory controller 130, timer 140 and processing unit—are non-operational), then the power supply monitor is configured to initiate a program operation (via debug data line 730) in memory device 710 upon the system failure. Similar to step 850 of FIG. 8, the power supply monitor issues a system failure program command on debug data line 730 upon detection of the system failure, according to an embodiment. A benefit, among others, of this architecture is that a system failure can be monitored when a power supply associated with one or more components of host device 720 falls below a predetermined voltage level.

Figure 9:
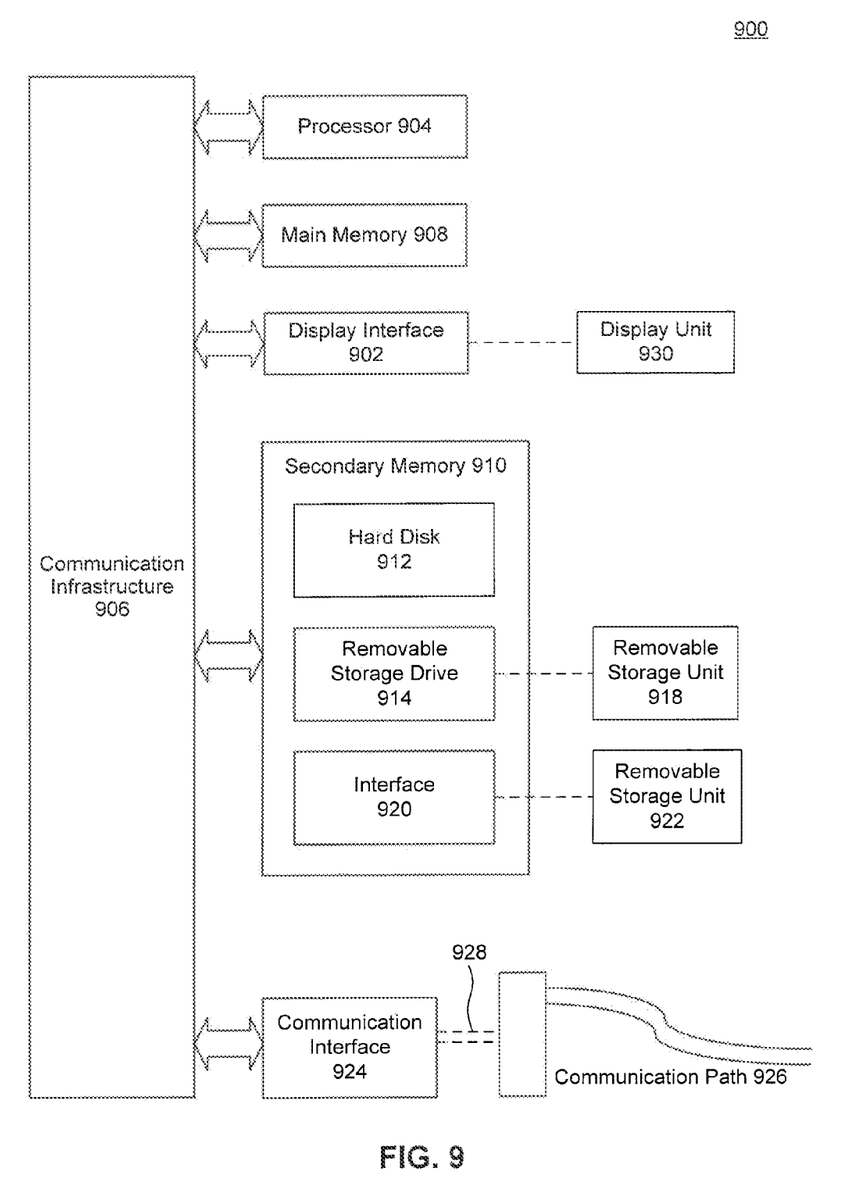
FIG. 9 is an illustration of an example computer system in which embodiments, or portions thereof, can be implemented as computer readable code.

Various aspects of embodiments of the present invention may be implemented in software, firmware, hardware, or a combination thereof. FIG. 9 is an illustration of an example computer system 900 in which embodiments of the present invention, or portions thereof, can be implemented as computer-readable code. In an embodiment, the methods illustrated by flowchart 200 of FIG. 2, flowchart 400 of FIG. 4, and flowchart 6 of FIG. 6, and flowchart 8 of FIG. 8 can be implemented in system 900. Various embodiments of the present invention are described in terms of this example computer system 900. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core that is embodied in program code and can be transformed to hardware as part of the production of integrated circuits.

Computer system 900 includes one or more processors, such as processor 904. Processor 904 may be a special purpose or a general-purpose processor such as, for example, processing unit 170 of FIGS. 1, 3, 5, and 7. Processor 904 is connected to a communication infrastructure 906 (e.g., a bus or network).

Computer system 900 also includes a main memory 908, preferably random access memory (RAM), and may also include a secondary memory 910. Secondary memory 910 can include, for example, a hard disk drive 912, a removable storage drive 914, and/or a memory stick. Removable storage drive 914 can include a floppy disk drive, a magnetic tape drive, an optical disk drive, a flash memory, or the like. The removable storage drive 914 reads from and/or writes to a removable storage unit 918 in a well-known manner. Removable storage unit 918 can comprise a floppy disk, magnetic tape, optical disk, etc. which is read by and written to by removable storage drive 914. As will be appreciated by a person skilled in the relevant art, removable storage unit 918 includes a computer-usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 can include other similar devices for allowing computer programs or other instructions to be loaded into computer system 900. Such devices can include, for example, a removable storage unit 922 and an interface 920. Examples of such devices can include a program cartridge and cartridge interface (such as those found in video game devices), a removable memory chip (e.g., EPROM or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices. Communications interface 924 can include a modem, a network interface (such as an Ethernet card), a communications port, a PCMCIA slot and card, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and can be implemented using wire or cable, fiber optics, a phone line, a cellular phone link, a RF link or other communications channels.

In this document, the terms "computer program medium" and "computer-usable medium" are used to generally refer to tangible media such as removable storage unit 918, removable storage unit 922, and a hard disk installed in hard disk drive 912. Computer program medium and computer-usable medium can also refer to tangible memories, such as main memory 908 and secondary memory 910, which can be memory semiconductors (e.g., DRAMs, etc.). These computer program products provide software to computer system 900.

Computer programs (also called computer control logic) are stored in main memory 908 and/or secondary memory 910. Computer programs may also be received via communications interface 924. Such computer programs, when executed, enable computer system 900 to implement embodiments of the present invention as discussed herein. In particular, the computer programs, when executed, enable processor 904 to implement processes of embodiments of the present invention, such as the steps in the methods illustrated by flowchart 200 of FIG. 2, flowchart 400 of FIG. 4, and flowchart 6 of FIG. 6, and flowchart 8 of FIG. 8 can be implemented in system 900, discussed above. Accordingly, such computer programs represent controllers of the computer system 900. Where embodiments of the present invention are implemented using software, the software can be stored in a computer program product and loaded into computer system 900 using removable storage drive 914, interface 920, hard drive 912, or communications interface 924.

Embodiments are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all example embodiments of the present invention as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by a person skilled in the relevant art in light of the teachings and guidance.

The breadth and scope of the present invention should not be limited by any of the above-described example embodiments, but should be defined only in accordance with the following claims and their equivalents.

What is claimed is:

1. A system comprising:
    a timer device integrated on a host device;
    a buffer, integrated on an another device, configured to receive debug data representative of one or more probed nodes in the system;
    a register, integrated on the another device, configured to receive memory address information; and
    a memory device, integrated on the another device, configured to store the debug data from the buffer at a memory address corresponding to the memory address information when a timer value of the timer device reaches zero, wherein the buffer is configured to transfer the debug data to the memory device in response to a system failure program command issued on a dedicated line.

2. The system of claim 1, further comprising:
    a processing unit configured to provide the timer value to the timer device and the memory address information to the register.

3. The system of claim 1, wherein the timer device comprises a watchdog timer.

4. The system of claim 1, wherein the debug data stored in the buffer is updated if the timer value of the timer device has not reached zero.

5. The system of claim 1, wherein the buffer comprises a volatile memory device and the memory device comprises a non-volatile memory device.

6. The system of claim 1, wherein the host device is in communication with the memory device.

7. The system of claim 6, wherein the buffer is configured to transfer the debug data to the memory device via a data bus coupling the host device to the memory device.

8. The system of claim 1, wherein the memory device is configured to receive the debug data from the buffer.

9. The system of claim 1, wherein the timer device is configured to transmit the system failure program command on the dedicated line when the timer value reaches zero.

10. The system of claim 1, wherein the dedicated line comprises a connection between a dedicated pin on the host device and a corresponding dedicated pin on the another device.

11. The system of claim 1, wherein the dedicated line transfers the debug data between a host device and the memory device, and wherein the host device comprises a processing unit.

12. A method comprising:
    receiving debug data in a buffer;
    receiving memory address information in a register; and
    storing, in a memory device, the debug data from the buffer at a memory address corresponding to the memory address information when a timer value of a timer device reaches zero, wherein the debug data is representative of one or more probed nodes in a system comprising the buffer, register, memory device, and timer device, wherein the timer device is integrated on a host device, wherein the buffer, the register, and the memory device are integrated on another device, and wherein the storing comprises receiving, at the memory device, the debug data from the buffer; and
    transmitting the debug data in the buffer to the memory device in response to a system failure program command issued on a dedicated line.

13. The method of claim 12, further comprising:
    updating the debug data in the buffer when the timer value of the timer device has not reached zero.

14. The method of claim 12, wherein the storing comprises the receiving, at the memory device, the debug data over a data bus coupling the host device to the memory device.

* * * * *